United States Patent [19]

Moore

[11] 4,303,991

[45] Dec. 1, 1981

[54] TIME-MODULATED DELAY SYSTEM

[76] Inventor: Christopher H. Moore, 53 Lawndale St., Belmont, Mass. 02178

[21] Appl. No.: 125,670

[22] Filed: Feb. 28, 1980

Related U.S. Application Data

[62] Division of Ser. No. 31,585, Apr. 19, 1979, Pat. No. 4,268,717.

[51] Int. Cl.³ .............................................. G06F 13/06

[52] U.S. Cl. ....................................... 364/900; 84/1.25

[58] Field of Search ... 364/200 MS File, 900 MS File; 84/1.28, 1.01, 1.25

[56] References Cited

U.S. PATENT DOCUMENTS 3,761,880 9/1973 Kritz .................................. 364/900

4,110,564 8/1978 Andresen ............................ 364/900

*Primary Examiner*—James D. Thomas

*Attorney, Agent, or Firm*—Joseph S. Iandiorio

[57] ABSTRACT

A time-modulated delay system having an input and a plurality of time-modulated output taps including storage means having a multiplicity of storage locations for storing successive portions of an interval of the input signal; a write address generator circuit for designating the address of locations in the storage means in which the successive portions of the input signal are stored; an output tap identifier circuit for sequentially identifying each output tap; a read address generator circuit responsive to the tap identifier circuit for designating a random address in the storage means from which a portion of the input signal is to be read for each time-modulated tap identified to produce a random modulation of the temporal pattern of the output taps; and a distribution circuit, responsive to the output tap identifier circuit, for delivering each portion of the input signal read out of the storage means to the corresponding identified tap. The delay system may be used in an audio reverberation simulator to provide both time-modulated output taps and temporally fixed output taps.

12 Claims, 6 Drawing Figures

12

96

TIME-MODULATED DELAY SYSTEM

This application is a division, of application Ser. No. 31,585, filed Apr. 19, 1979 now U.S. Pat. No. 4,268,717.

FIELD OF INVENTION

This invention relates to a reverberation simulator using fixed taps and time-modulated taps and more broadly to a time-modulated delay system which generates time-modulated signals at its output taps and is useful in such a reverberation simulator.

BACKGROUND OF INVENTION

The acoustical contribution of the room or surroundings where music is played has much to do with the enjoyment of the sounds. Smaller rooms and those with more sound-absorbing materials tend to have less reverberation than larger rooms and those containing more reflective surfaces. Often the area where music is being recorded or played back does not have the desired acoustical characteristics, for example reverberation. Reverberation simulators have been proposed to meet this problem. Typically they have used a few taps on a delay line: two or three taps, usually not more than four or five. The output of one or more of the taps is fed back to the input to generate the reverberation through the delay line and output from the taps is also used as the reverberated output of the simulator. Due to the feedback loop the pattern of the delay line tap outputs fed back, eventually, after a few cycles of operation, produces a detectable pattern or "flutter echo" which distorts the system performance. As the feedback is increased to lengthen the reverberation decay time, ringing and resonance occur, and finally complete system instability occurs as oscillation builds up. The use of more taps does little to correct this problem: the pattern is still detectable—it is just a more complex pattern, and the problem of instability remains. Another approach uses various multi-loop delay algorithms based on the work of Schroeder, and requires costly high-speed digital signal processing or very critical analog circuit design and analog memory.

SUMMARY OF INVENTION

It is an object of this invention to provide a time-modulated delay system which provides one set of temporally fixed taps and a second set of time modulated taps.

It is a, broad object of this invention to provide a delay system having time-modulated output taps.

The invention results from the realization that a delay system with time-modulated output taps could be made by writing in a memory successive portions of a signal and reading out randomly selected temporally and spatially separated previously stored portions for submission to the output taps, and from the further realization that an improved reverberation simulator could be produced using such a delay system which had temporally fixed taps for auditioning as well as separate, time-modulated taps for feedback.

The invention features a time-modulated delay system having an input and a plurality of time-modulated output taps. There are storage means having a multiplicity of storage locations for storing successive portions of an interval of the input signal. The write address generator circuit designates the address of locations in the storage means at which the successive portions of the input signal are stored. The length of the interval of the input signal which can be stored in the storage means defines the maximum delay obtainable with the system. An output tap identifier circuit sequentially identifies each output tap. A read address generator circuit is responsive to the tap identifier circuit for designating a random address in the storage means from which a portion of the input signal is to be read for each time-modulated tap which has been identified. This produces a random modulation of the temporal pattern of the output taps. A distribution circuit which is responsive to the output tap identifier circuit delivers each of the portions of the input signal read out of the storage means to the corresponding identified tap.

In a preferred embodiment, the time-modulated delay system is used in an audio reverberation simulator and provides a plurality of temporally fixed output taps in addition to the plurality of time-modulated output taps. There are first means for combining the output of a plurality of time-modulated taps to produce a feedback signal. Second means combine the feedback signal and an audio input signal for submission to the delay system. Third means combine the audio input signal and the outputs from the plurality of temporally fixed taps to produce a simulated reverberated audio output signal.

In a preferred embodiment, the read address generator circuit includes a fixed address generator circuit for generating a fixed address factor for each fixed tap designated by the identifier circuit. The read address generator circuit may also include a random access generator circuit for generating a random address factor for each time-modulated tap designated by the identifier circuit.

The read address generator circuit may also include an adder circuit which combines the fixed address factor and the write address to designate a storage address to be read for the identified fixed tap. The same adder circuit may be used to combine the random address factor, fixed address factor, and write address to establish a storage address to be read for the identified modulated tap.

Typically, the fixed address generator circuit includes means for defining a set of fixed address factors for the time-modulated taps in which the increment between factors in the set decreases as the factors increase. The random address generator circuit may include means for varying the random address factors in cyclical patterns, and the cyclical patterns may increase in period with increase in the address factors. The cyclical patterns may be generated in complementary pairs corresponding to successive pairs of the modulated taps.

The storage means may include a sample and hold circuit responsive to the input signal for sampling and holding portions thereof, an analog to digital converter circuit for converting the held portion from analog to digital form, a digital memory device for storing the digital output from the analog to digital converter circuit, a digital to analog converter for converting the stored digital information into analog form, and a write/read multiplexor circuit for selectively enabling reading out of or writing in to the memory device in response to the read address generator circuit and the write address generator circuit.

The distribution circuit may include a de-multiplexing circuit and a plurality of sample and hold circuits corresponding to the number of output taps.

DISCLOSURE OF PREFERRED EMBODIMENT

Other objects, features and advantages will occur from the following description of a preferred embodiment and the accompanying drawings, in which.

Figure 1:
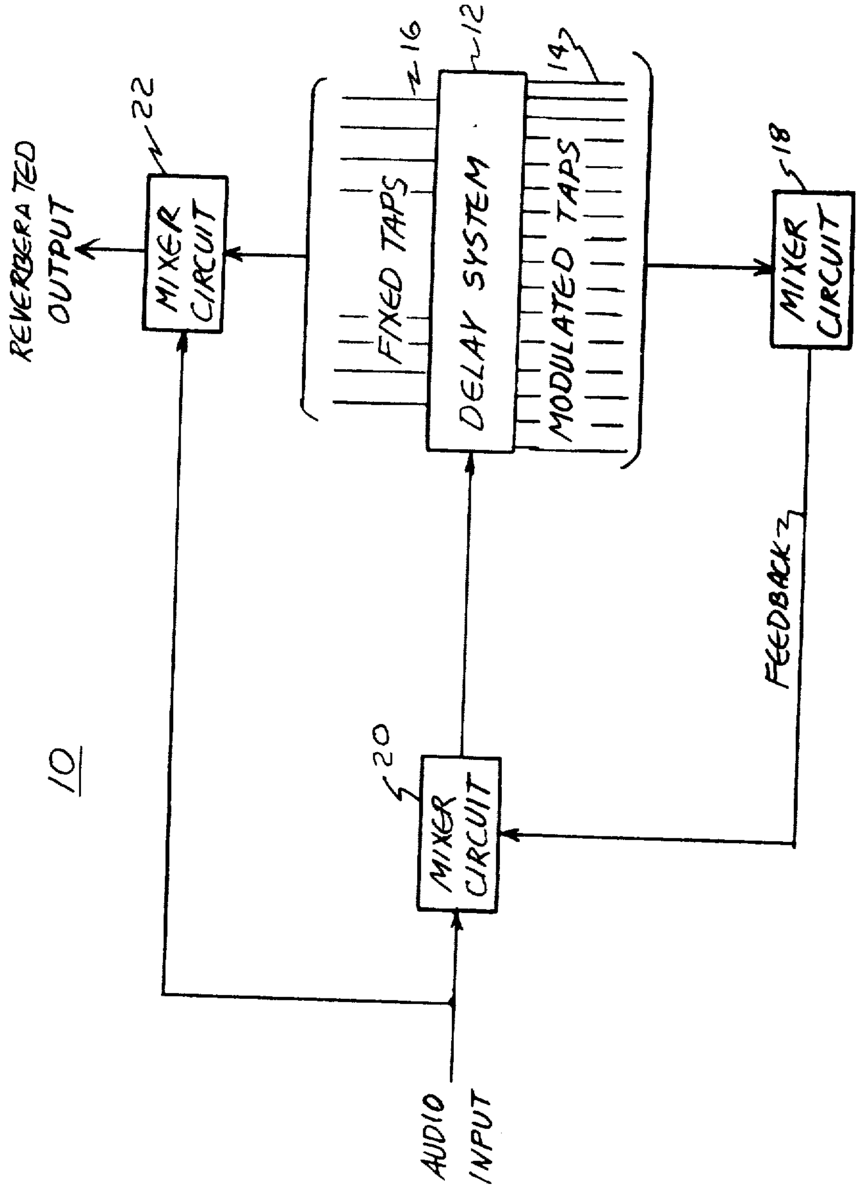
FIG. 1 is a schematic block diagram of a reverberation simulator according to this invention.
Figure 2:
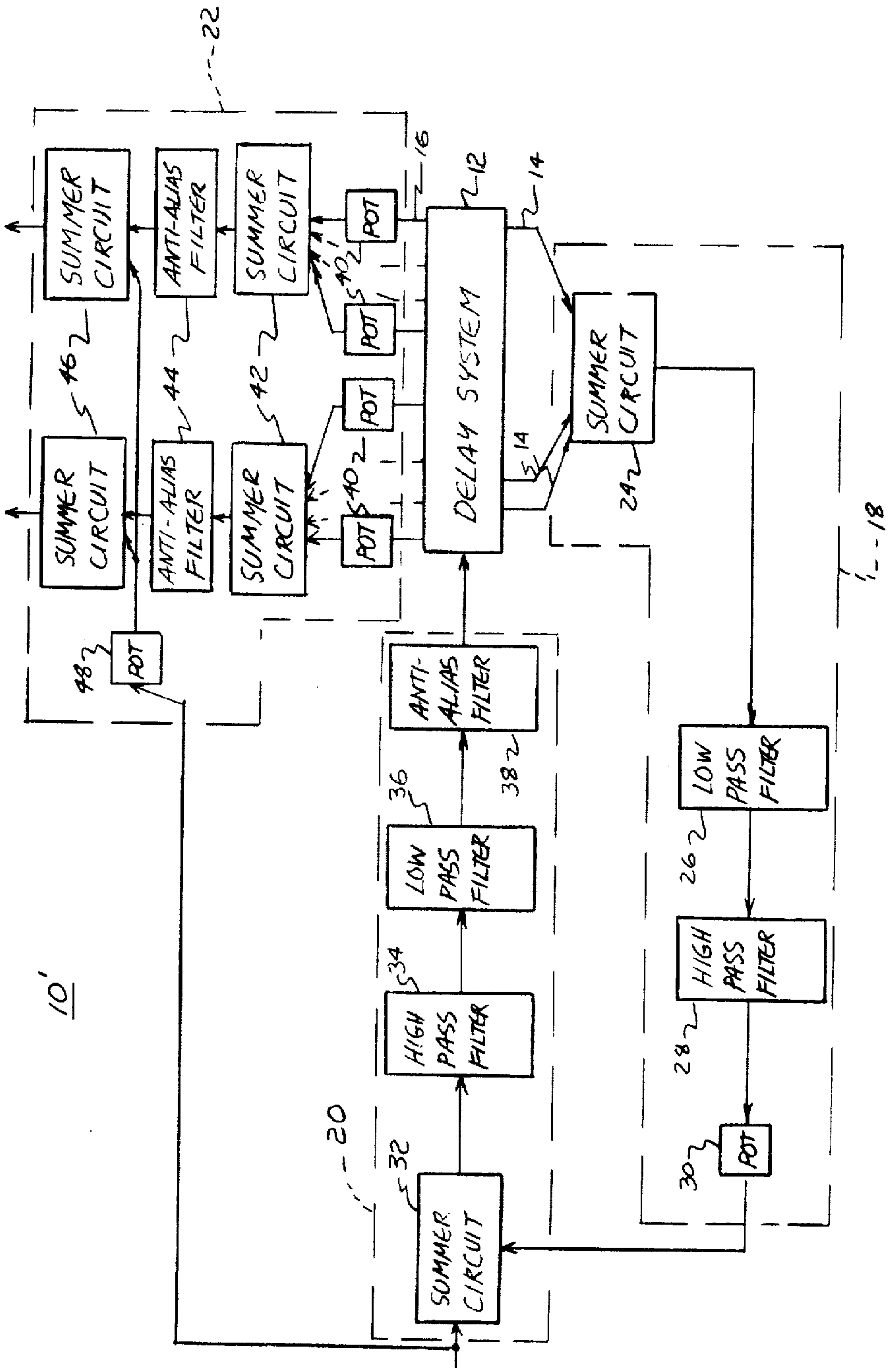
FIG. 2 is a more detailed schematic diagram of a reverberation simulator according to this invention.

The time-modulated delay system may be accomplished by using a storage means which has a multiplicity of storage locations for storing successive portions of an interval of the input signal. The storage means may be analog or digital. A write address generator circuit generates the address of locations in the storage means in which the successive portions of the input signal are stored. For example, the storage typically may include 4,096 eleven-bit storage locations. An output tap identifier circuit sequentially identifies each output tap. This may be, for example, a counter which counts from 1 to n, where n is the total number of taps, both fixed, f, and modulated, m. There is a read address generator circuit, responsive to the tap identifier circuit, which designates the random address in the storage means from which a portion of the input signal is to be read for each time-modulated tap identified. For example, if there are n output taps, each time a portion of the input signal is written into an address in memory, m randomly selected addresses in memory are read out to the corresponding m output taps. In a typical analog or digital storage device the difference between the write address and the read for any one of the randomly selected n read addresses determines the time delay which that particular read-out portion of the input signal bears to the presently written portion of the input signal. In this way, each time there is a new portion written in to the memory, m randomly selected previously recorded portions are read out to the m output taps so that the temporal pattern of those output taps does not repeat for a long time; it is changing over time and thereby prevents establishment of a detectable pattern or distortion.

A distribution circuit responds to the output tap identifier circuit and delivers each of the portions of the input signal which has been read out of the n addresses of the storage to the corresponding identified tap.

The read address generator circuit includes a random address generator circuit which generates a random address factor for each time-modulated tap designated by the identifier circuit. An adder circuit in the read address generator circuit typically combines this random address factor with a fixed address factor and the write address to establish a storage address to be read for the identified tap. The time-modulated delay system may further include a plurality of temporally fixed delay output taps which are separate from the time-modulated output taps. In that case the read address generator circuit also includes a fixed address generator circuit which generates a fixed address factor for each fixed tap designated by the identifier circuit. The adder in the read address generator circuit combines the fixed address factor with the write address factor to designate the storage address to be read for the identified fixed tap. The fixed address generator circuit includes means such as a programmable read-only memory for defining a set of fixed address factors for the modulated taps in which the increment between the factors in the set may increase, decrease, or remain the same as the factors increase. The random address generator circuit may include means for varying the random address factors in cyclical patterns; for example the pattern may be a triangular wave form established by a counter which repeatedly counts up from 0 to 127 and back down to 0.

The cyclical patterns may increase in period with increase in address factors, so that as the address factor becomes larger the periods of the triangular waves, for example, become longer. The cyclical patterns may be generated in complementary pairs corresponding to successive pairs of the modulated taps so that for each tap whose random address factor is increasing there is a paired tap whose random address factor is decreasing. Thus the Doppler shift in one direction by one tap is combined with a Doppler effect in the opposite direction by the paired tap. This tends to prevent a noticeable shift in pitch which could occur if all or most time-modulated taps have their address factors moving in the same direction at the same time.

There is shown in FIG. 1 a reverberation simulator 10 including a delay system 12 having a group of time-modulated taps 14 and a separate group of temporally fixed taps 16. Modulated taps 14 are combined in mixer circuit 18 and fed back to mixer circuit 20, where the feedback signal is combined with the audio input signal and provided to the input of delay system 12. The outputs from fixed taps 16 are fed to mixer circuit 22, where they are combined with the audio input to provide the reverberated output. Thus, the time-modulated taps which are used to feed back into delay system 12 to provide the reverberating background are totally separate from the temporally fixed taps 16 which are used only for auditioning; that is, listening.

Mixer circuit 18 may include a summing circuit 24, low-pass filter 26, high-pass filter 28, and amplitude control potentiometer 30. By using potentiometer 30 to turn down the amplitude of the feedback signal, the reverberation can be eliminated. Mixer circuit 20 includes summer circuit 32, high-pass filter 34, low-pass filter 36, and anti-alias filter 38. High-pass filters 28 and 34 are the bass controls that shape the low frequency tonal character of the signal. Reducing the bass creates the sound of a room with hard walls and small volume, where the bass portion of a reverberating signal dies out rapidly. Low-pass filters 26 and 36 are essentially treble controls that cause a dulling of the reflected and reverberated sounds, as would occur in a room with heavy drapes or acoustically absorbent wall material.

Mixer circuit 22 includes an amplitude control, potentiometers 40, in each temporally fixed output tap 16. Mixer circuit 22 also includes one or more summing circuits 42, output anti-alias filter 44, and summing circuits 46. The number of such circuits depends upon the number of groups into which the fixed taps 16 are desired to be separated. Two or more groups of audition taps may be used to establish stereo or quadraphonic perspective. Summing circuits 42 combine the outputs of the taps connected to their input. Summing circuits 46 combine the outputs of summing circuits 42 through filter 44 and the audio input signal. An amplitude control, potentiometer 48, is also included in mixer circuit 22 to control the amplitude of the audio input signal being combined in summing circuits 46.

For system stability and the reduction of flutter echo or patterns detectable in the reverberation, the feedback taps must be modulated. Yet the modulation introduces problems: every time the delay time is modulated (here by one sample time, about 61 μs), a small amplitude skip and phase discontinuity may occur in the reconstructed audio waveform. This may result in noise and distortion, and the audibility or magnitude of such distortion is a direct function of the signal amplitude and frequency: large amplitude high frequency signals change most rapidly and show the largest discontinuities at modulation points. The second problem is that a modulated tap exhibits pitch shift, like Doppler shift, when the observer is moving. Decreasing delay time yields pitch increases, and increasing delay yields pitch decreases. Both of these effects—noise and pitch errors—are quite noticeable on an individual modulated tap signal, since all sounds in memory are heard through the noisy, pitch-shifted taps, even the portion of the original sound just written into memory. If the modulated taps are fed back, then the fed-back portion of the sounds in memory are noisy and pitch-shifted to be sure, but the direct original signal in memory is not. So if one listens via temporally fixed taps, one at least hears the original un-fedback signal without pitch distortion or modulation noise, even though the fed-back portion of the sound in memory has been distorted by time-modulation.

Figure 3:
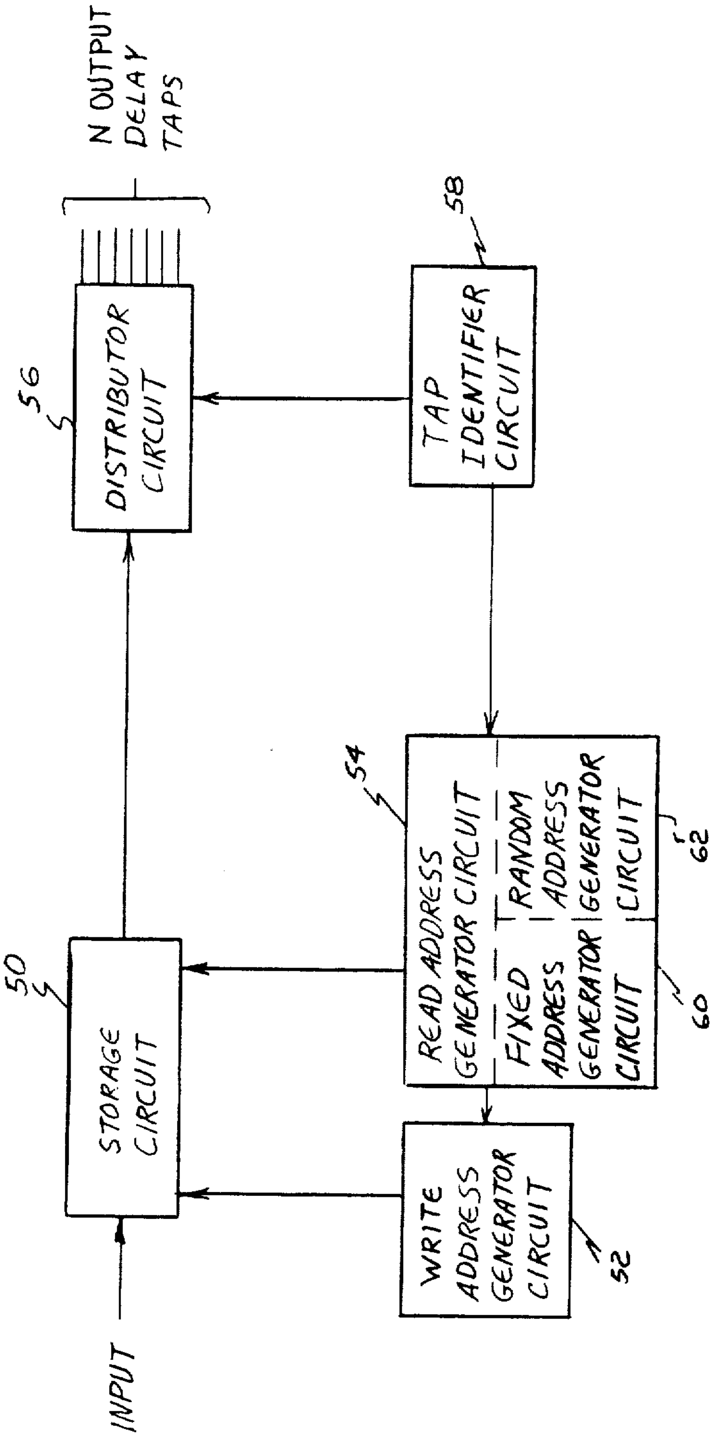
FIG. 3 is a block diagram of a time-modulated delay system according to this invention which may be used in the reverberation simulator of FIGS. 1 and 2.

Time-modulated delay system 12, FIG. 3, may include a storage circuit 50 which stores successive portions of an input signal in successive address locations as indicated by write address generator circuit 52. Read address generator circuit 54 provides twenty-four addresses to storage circuit 50 to read out twenty-four previously stored portions for delivery to distributor circuit 56. Tap identifier circuit 58 identifies each of the twenty-four output delay taps in sequence to read address generator circuit 54 and distributor circuit 56 so that a specific address is generated for each of the twenty-four taps identified by tap identifier circuit 58 and the portion stored in that particular selected address is read out to distributor circuit 56 and delivered to the proper identified one of the twenty-four taps. Eight of the twenty-four output delay taps are temporally fixed, the other sixteen are time modulated. The fixed address generator circuit 60 services the former, the random address generator circuit 62 the latter.

Figure 4:
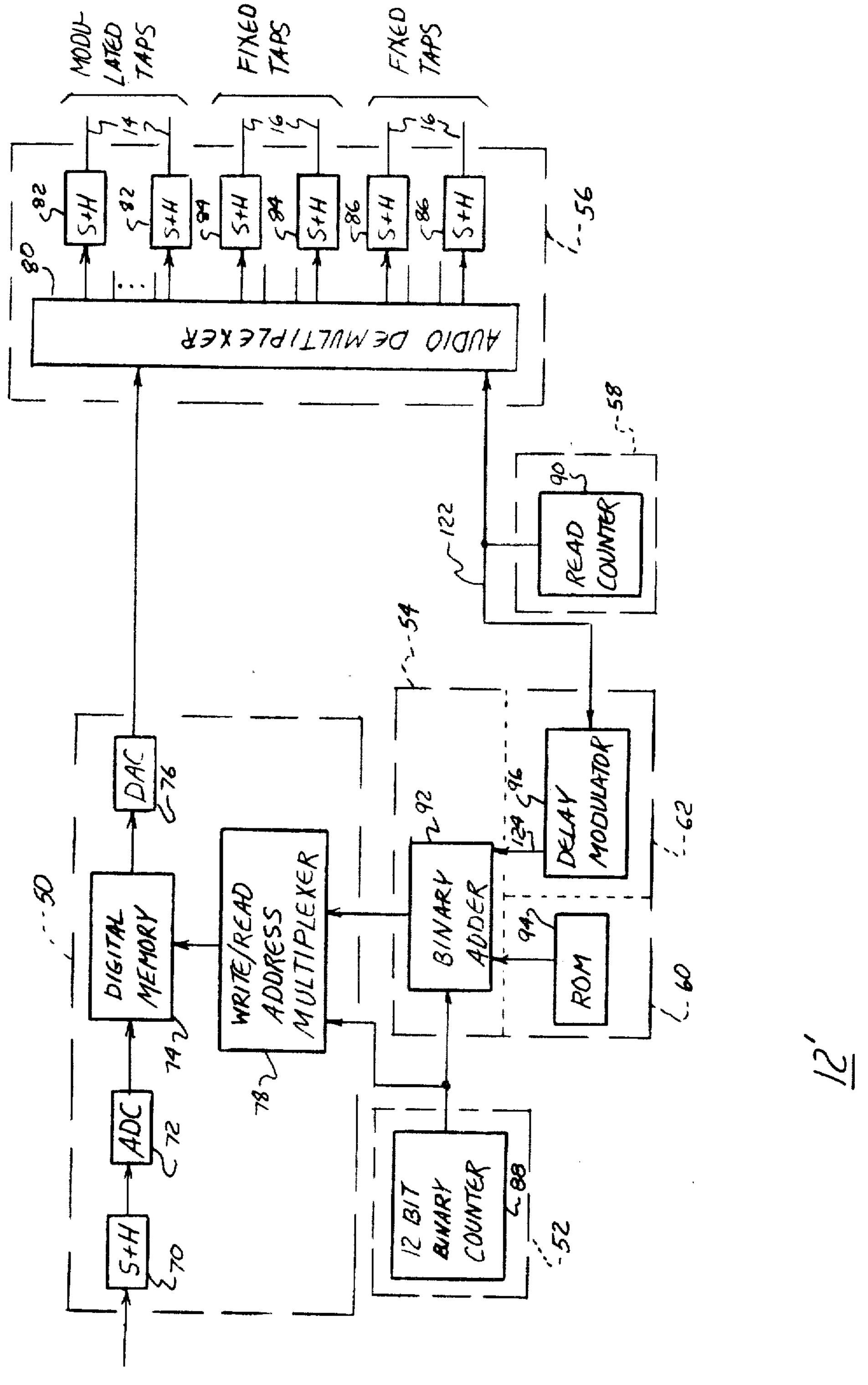
FIG. 4 is a more detailed block diagram of the time-modulated delay system of FIG. 3.

Storage circuit 50 may include a sample and hold circuit 70, FIG. 4, an analog-to-digital converter 72, digital memory 74, digital-to-analog converter 76, and a write/read address multiplexor 78. Memory 74, for example, provides storage for 4,096 eleven-bit binary words. Distributor circuit 56 includes an audio de-multiplexor 80 and sixteen sample and hold circuits 82 corresponding to sixteen time-modulated taps 14. In addition there are four sample and hold circuits 84 corresponding to one group of four fixed taps 16, and a second set of four sample and hold circuits 86 associated with the other four fixed taps 16. Write address generator circuit 52 may include simply a twelve-bit binary down counter 88 which counts repeatedly from 4095 to 0; and tap identifier circuit 58 may simply include a read counter 90 which counts from 1 to 24, thereby identifying the sixteen time-modulated taps 14 and the eight fixed taps 16. Read address generator circuit 54 includes a twelve-bit binary adder 92 in addition to fixed and random address generator circuits 60, 62. Fixed address generator circuit 60 may include a programmed read-only memory 94 and random address generator circuit 62 may include a delay modulator circuit 96.

In operation, a portion of the input signal presented to sample and hold circuit 70 is converted to digital form and submitted to memory 74, where it is stored in a location with an address from 0 to 4,095, depending upon the current count in write counter 88. Subsequently, write/read address multiplexor 78 is switched to the read mode. Read counter 90 then counts from 1 to 24, thereby sequentially identifying each of the twenty-four taps. Each of the twenty-four taps has associated with it a fixed time delay represented by a fixed address factor specifically associated with that tap in read-only memory (ROM) 94. That fixed address factor is submitted to binary adder 92, where it is combined with the eight highest order bits of the twelve-bit address presently in write counter 88. For the first sixteen taps identified by counter 90, that is the time-modulated taps, delay modulator 96 provides a seven-bit random address factor, which is combined in binary adder 92 with the lowest seven bits of the twelve-bit address from write counter 88. Subsequently, as the remaining eight fixed taps are identified by counter 90, delay modulator 96 puts out all zeros so that there is no additional random factor introduced in the development of the read address in binary adder 92. The twenty-four addresses thus constructed by binary adder 92, the first sixteen random addresses for the time-modulated taps, and the last eight of the twenty-four, which are the addresses for the fixed taps, are submitted in sequence through multiplexor 78 to memory 74. The twenty-four portions at the twenty-four different memory locations are addressed. The data at those addresses is converted from digital to analog form by digital-to-analog converter 76 and then submitted to audio de-multiplexor 80. As they are serially received by de-multiplexor 80, the data from converter 76 is directed by the signal from counter 90 to the proper one of the sample and hold circuits 82, 84, 86.

With a sample and hold rate of 16,384 cycles/second, the 4096 location memory 74 represents a 256 millisecond maximum delay. Each write/read cycle as just described occurs in approximately 61 microseconds. The basic delay in milliseconds as represented by the fixed address factor in ROM 94 is shown for taps 1–24 below.

| Tap No. | Base Delay (Milliseconds) | | Delay Increment | |
|---|---|---|---|---|
| 1 | 47 | | 73 | |
| 2 | 120 | INCREASING | 14 | DECREASING |
| 3 | 134 | DELAY | 12 | INCREMENT |
| 4 | 146 | ↓ | 12 | ↓ |
| 5 | 158 | ↓ | 11 | ↓ |

-continued

| | Tap No. | Base Delay (Milliseconds) | | Delay Increment | |
|---|---|---|---|---|---|
| TIME MODULATED | 6 | 169 | ↓ | 11 | ↓ |
| | 7 | 180 | ↓ | 10 | ↓ |
| | 8 | 190 | ↓ | 10 | ↓ |
| | 9 | 200 | ↓ | 9 | ↓ |
| | 10 | 209 | ↓ | 9 | ↓ |
| | 11 | 217 | ↓ | 8 | ↓ |
| | 12 | 225 | ↓ | 8 | ↓ |
| | 13 | 233 | ↓ | 7 | ↓ |
| | 14 | 240 | ↓ | 7 | ↓ |
| | 15 | 244 | ↓ | 4 | ↓ |
| | 16 | 247 | ↓ | 3 | ↓ |
| Temporally Fixed | 17 | 60 | | | |
| | 18 | 77 | | | |
| | 19 | 137 | | | |
| | 20 | 112 | | | |
| | 21 | 175 | | | |
| | 22 | 160 | | | |
| | 23 | 190 | | | |
| | 24 | 212 | | | |

Note that while the delay in milliseconds increases from 47 to 247 milliseconds from taps 1-16, the incremental value decreases. It has been found that there is less distortion and better performance with the incremental value thus decreasing in the time-modulated taps. The delay associated with each of the time-modulated taps may be generated totally randomly or in a cyclical random pattern by modulator 96. For example, modulator 96 may produce triangular outputs 100, 102, which are based on 47 millisecond and 120 millisecond baselines for taps 1 and 2, respectively. Output 102 is the complement or mirror image of output 100. The peak-to-peak delay modulation introduced onto outputs 100 and 102 is eight milliseconds, which is divided into 128 steps by a suitable counter. Outputs 104 and 106 associated with taps 3 and 4 are similarly constructed and have the same eight millisecond peak-to-peak delay. The remaining outputs associated with taps 5-16 are produced in the same way by modulator 96, the only difference being that the period of the modulation increases as the fixed address factor or baseline increases from 0 toward 256 milliseconds. For example, the periods for the outputs associated with the modulated taps are tabulated below.

| Tap No. | Modulation Period (seconds) |
|---|---|
| 1 | 1.5 |
| 2 | 1.5 |
| 3 | 1.6 |
| 4 | 1.6 |
| 5 | 1.8 |
| 6 | 1.8 |
| 7 | 2.1 |
| 8 | 2.1 |
| 9 | 2.3 |
| 10 | 2.3 |
| 11 | 3.3 |
| 12 | 3.3 |
| 13 | 5.5 |
| 14 | 5.5 |
| 15 | 8.2 |
| 16 | 8.2 |

Feeding back short delay times has the advantage of building up a high echo density in the reverberation quickly, but decay times are short and the pattern caused by the fixed delay time may be heard as ringing. To gain a longer decay time, long base delays are used as well as some short ones. Longer delay times also take longer to reveal the pattern they cause in the reverberation. Using more and more delay taps as base delay increases enhances stability and lengthens the decay time. It also mimics the situation in an actual room, where the echo density increases with time.

Due to the noise and pitch distortions which may be introduced by modulation, the slowest possible overall modulation is used, and there is a trade between stability (fast modulations) but with more noise, and some ringing but with less noise (slower modulations). The shortest delay taps are modulated the fastest in order to minimize ringing; the longer base delay taps take a long time to produce a noticeable pattern, so they need not be randomized so rapidly.

If more than half the taps are shifting up (or down) at a time, the summed fedback signal has a predominantly up or downshifted pitch, and this is audible as pitch-wandering in the reverberation as it dies out. If the up and down-moving taps are balanced in number, the pitch shifts tend to be heard as wow and flutter, but not as an overall pitch shift. Also, signals shifted down in pitch by one tap, fedback, and then heard through a down pitch-shifting tap tend to be corrected in pitch by at least half the taps.

Figure 6:
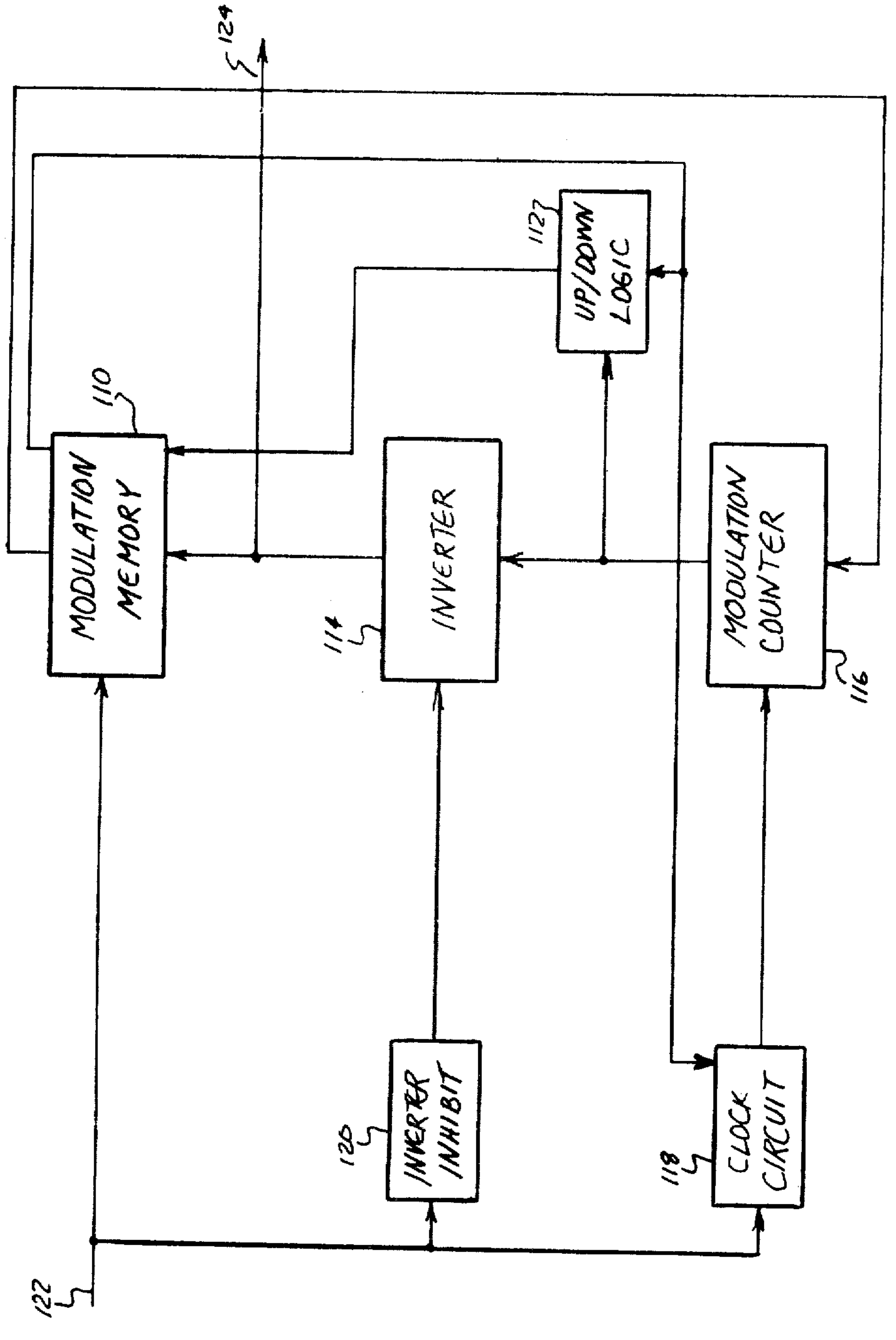
FIG. 6 is a detailed schematic block diagram of the delay modulator of FIG. 4.

Modulator 96, FIG. 6, may include a modulator memory 110, up-down determination logic 112, inverter 114, modulation counter 116, clock circuit 118, and an inverter-inhibitor circuit 120. In operation, the signal from read counter 90 on line 122 identifies to clock circuit 118 the period, and thus the rate, at which modulation counter 116 should be made to count. The same signal provided to inverter-inhibitor 120 causes modulation inverter 114 to pass the count which it holds directly through to modulation memory 110 and binary adder 92 if the signal on line 122 represents an odd numbered tap, or invert it and then pass it on to binary adder 92 if it is an even numbered tap. Modulation memory 110 provides eight storage locations for eight-bit words. The signal on line 122 identifying a particular tap is also fed to modulation memory 110. Modulation memory 110 need store only eight words representative of the previous state of each random address factor of the eight odd-numbered taps 1, 3, 5, 6, 9, 11, 13, and 15, for the corresponding even numbered taps are simply mirror images of them. The signal on line 122 which operates inverter-inhibitor 120 and clock circuit 118 also causes to be read out of modulator memory 110 an eight-bit word, seven bits representing the last count associated with that tap in the previous cycle of operation, and an eighth bit which indicates whether the next count is to move up or down. The seven-bit count is loaded into modulation counter 116; the up-and-down bit is loaded into circuit 112 and clock circuit 118. Thus the clock circuit is now aware of the rate and the direction in which it is to drive modulation counter 116. After operation of the clock circuit, which may or may not step counter 116, the up-down logic circuit determines the up-down bit to be stored along with the seven-bit modulation-counter output in modulator memory 110.

Figure 5:
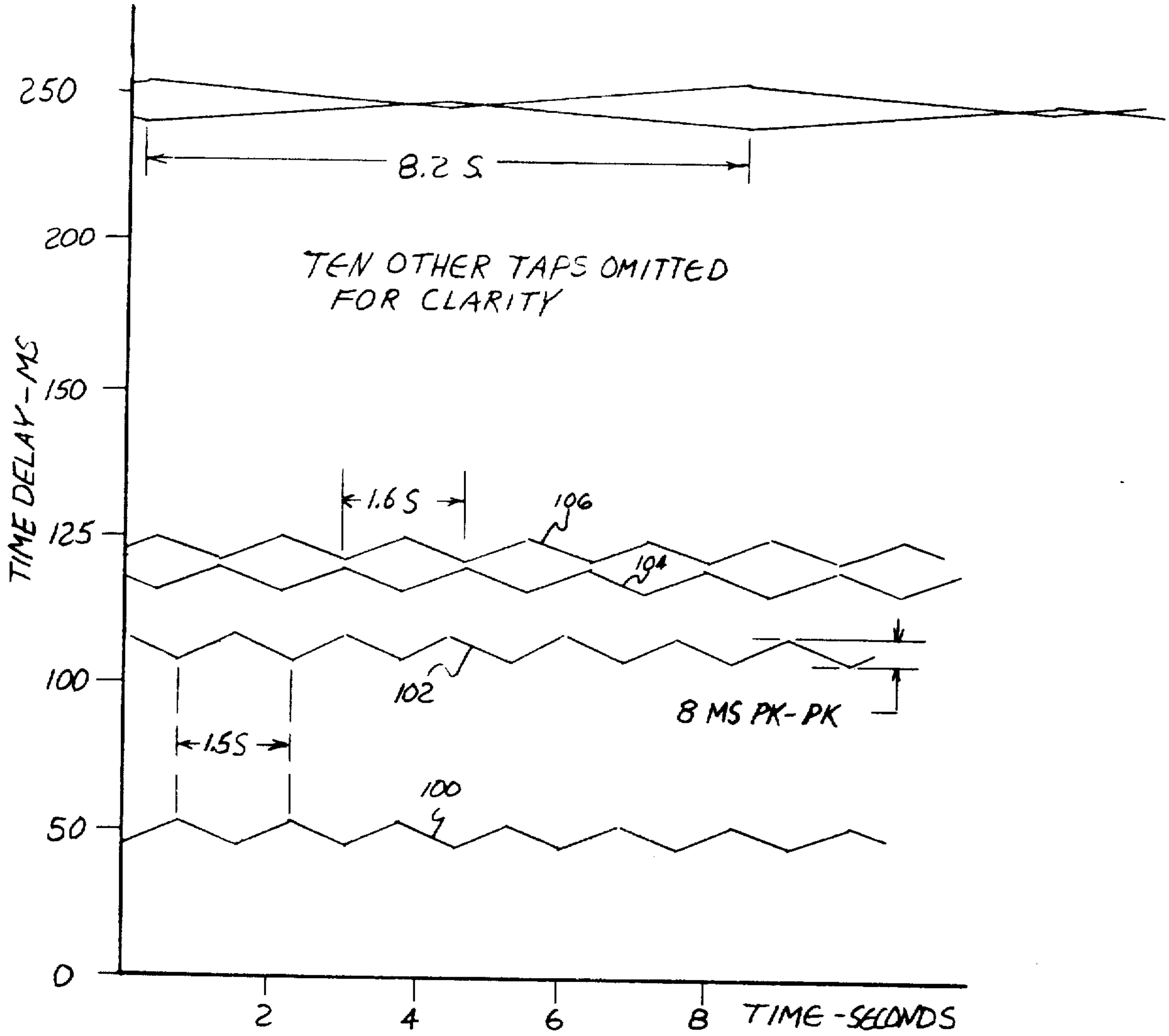
FIG. 5 is a timing diagram illustrating the generation of cyclical patterns of variation of random address factors by the delay modulator of FIG. 4.

Now, before the tap identifier circuit advances, the seven-bit modulation counter output is written into modulation memory 110 over the pre-existing data. If modulation counter 116 contains all ones, then logic circuit 112 loads a down bit; and if it is all zeros it loads an up bit. Otherwise it simply reloads the bit which was previously supplied to it. In this way the triangular output shapes illustrated in FIG. 5 are generated and the counts represented by all sixteen of them at any given moment are provided in sequence on output line 124.

Other embodiments will occur to those skilled in the art and are within the following claims.

What is claimed is:

1. A time-modulated delay system having an input and a plurality of time-modulated output taps comprising:

storage means having a multiplicity of storage locations for storing successive portions of an interval of the input signal;

a write address generator circuit for designating the address of locations in said storage means at which said successive portions of said input signal are stored;

and output tap identifier circuit for sequentially identifying each output tap;

a read address generator circuit, responsive to said tap identifier circuit, for designating a random address in said storage means from which a said portion of said input signal is to be read for each time-modulated tap identified, to produce a random modulation of the temporal pattern of said output taps; and a distribution circuit, responsive to said output tap identifier circuit, for delivering each said portion of said input signal read out of said storage means to the corresponding identified tap.

2. The time-modulated delay system of claim 1 further including a plurality of temporally fixed output taps and said read address generator circuit further including a fixed address generator circuit for generating a fixed address factor for each fixed tap designated by said identifier circuit.

3. The time-modulated delay system of claim 1 in which said storage means includes a sample and hold circuit responsive to the input signal for sampling and holding a said portion thereof, an analog-to-digital converter circuit responsive to said sample and hold circuit for converting the sampled said portion from analog to a digital form, a digital memory device for storing the digital output from said analog-to-digital converter circuit, a digital-to-analog converter circuit for converting the stored digital information into analog form, and a write/read multiplexor circuit for selectively enabling reading out or writing in to said memory device in response to said read address generator circuit and said write address generator circuit.

4. The time-modulated delay system of claim 1 in which said distribution circuit includes a de-multiplexing circuit and a plurality of sample and hold circuits corresponding in number to the number of output taps.

5. The time-modulated delay system of claim 1 in which said write address generator circuit includes a write counter circuit whose count cycle corresponds to the number of addressable storage locations in said storage means.

6. The time-modulated delay system of claim 2 in which said read address generator circuit includes an adder circuit which combines said fixed address factor and the write address to designate a storage address to be read for the identified fixed tap.

7. The time-modulated delay system of claim 1 in which said read address generator circuit includes a random address generator circuit for generating a random address factor for each time-modulated tap designated by said identifier circuit.

8. The time-modulated delay system of claim 6 in which said read address generator circuit includes a random address generator circuit for generating a random address factor for each time-modulated tap designated by said identifier circuit, and said adder circuit combines said random address factor, fixed address factor, and write address to establish a storage address to be read for the identified modulated tap.

9. The time-modulated delay system of claim 2 in which said fixed address generator circuit includes means for defining a set of fixed address factors for said modulated taps in which the increment between factors in the set decreases as the factors increase.

10. The time-modulated delay system of claim 7 in which said random address generator circuit includes means for varying said random address factors in cyclical patterns.

11. The time-modulated delay system of claim 10 in which said cyclical patterns increase in period with increase in address factors.

12. The time-modulated delay system of claim 11 in which said cyclical patterns are generated in complementary pairs corresponding to successive pairs of said modulated taps.

* * * * *